United States Patent
Xu et al.

(10) Patent No.: US 10,602,176 B2
(45) Date of Patent: Mar. 24, 2020

(54) CODING INTERPOLATION FILTER TYPE

(71) Applicant: GOOGLE INC., Mountain View, CA (US)

(72) Inventors: Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 123 days.

(21) Appl. No.: 15/099,853

(22) Filed: Apr. 15, 2016

(65) Prior Publication Data

US 2017/0302950 A1 Oct. 19, 2017

(51) Int. Cl.
*H04N 19/513* (2014.01)
*H04N 19/176* (2014.01)
(Continued)

(52) U.S. Cl.
CPC ......... *H04N 19/513* (2014.11); *H04L 65/607* (2013.01); *H04N 19/117* (2014.11);
(Continued)

(58) Field of Classification Search
CPC ...... H04N 19/527; H04N 19/50; H04N 19/51; H04N 19/53; H04N 19/56
See application file for complete search history.

(56) References Cited

U.S. PATENT DOCUMENTS

2012/0082217 A1* 4/2012 Haskell ............... H04N 19/176
375/240.12
2012/0155533 A1 6/2012 Puri et al.
(Continued)

FOREIGN PATENT DOCUMENTS

| CN | 2014058796 A1 | 4/2014 |
| WO | 2011128023 A1 | 10/2011 |
| WO | 2016082217 A1 | 6/2016 |

OTHER PUBLICATIONS

Ohm JR, Sullivan GJ, Schwarz H, Tan TK, Wiegand T. Comparison of the coding efficiency of video coding standards-including high efficiency video coding (HEVC). IEEE Transactions on circuits and systems for video technology. Dec. 2012;22(12):1669-84.*

(Continued)

*Primary Examiner* — Clifford Hilaire
(74) *Attorney, Agent, or Firm* — Young Basile Hanlon & MacFarlane, P.C.

(57) ABSTRACT

Decoding a video stream may include decoding a first block of a current frame by decoding a first motion vector from the encoded video stream, decoding an identifier of a first interpolation filter from the encoded video stream, and reconstructing the first block using the first motion vector and the first interpolation filter. Decoding a second block of the current frame may include identifying the first motion vector from the first block as a selected motion vector for predicting the second block in response to decoding an inter-prediction mode identifier for decoding the second block, identifying the first interpolation filter as a selected interpolation filter for predicting the second block in response to identifying the first motion vector from the first block as the selected motion vector for predicting the second block, and reconstructing the second block using the first motion vector and the first interpolation filter.

14 Claims, 8 Drawing Sheets

(51) Int. Cl.
H04N 19/523 (2014.01)
H04N 19/159 (2014.01)
H04N 19/52 (2014.01)
H04N 19/463 (2014.01)
H04N 19/44 (2014.01)
H04N 19/82 (2014.01)
H04N 19/117 (2014.01)
H04L 29/06 (2006.01)

(52) U.S. Cl.
CPC ......... H04N 19/159 (2014.11); H04N 19/176 (2014.11); H04N 19/44 (2014.11); H04N 19/463 (2014.11); H04N 19/52 (2014.11); H04N 19/523 (2014.11); H04N 19/82 (2014.11)

(56) References Cited

U.S. PATENT DOCUMENTS

| | | | |
|---|---|---|---|
| 2013/0208795 A1* | 8/2013 | Xu | H04N 19/52 375/240.16 |
| 2015/0055705 A1 | 2/2015 | Yie et al. | |
| 2015/0055706 A1* | 2/2015 | Xu | H04N 19/52 375/240.16 |
| 2015/0195562 A1* | 7/2015 | Li | H04N 19/523 375/240.02 |
| 2015/0229953 A1 | 8/2015 | Oh et al. | |
| 2017/0280159 A1* | 9/2017 | Xu | H04N 19/593 |

OTHER PUBLICATIONS

Ohm, J-R., et al. "Comparison of the coding efficiency of video coding standards—including high efficiency video coding (HEVC)." IEEE Transactions on circuits and systems for video technology 22.12 (2012): 1669-1684.*
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

CODING INTERPOLATION FILTER TYPE

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Various approaches have been proposed to reduce the amount of data in video streams, including compression and other encoding and decoding techniques. These techniques may involve subpixel interpolation for fractional motion.

SUMMARY

This application relates to encoding and decoding of video stream data for transmission or storage. Disclosed herein are aspects of systems, methods, and apparatuses related to associating a motion vector with an interpolation filter type for inter-predicted blocks of a video data frame.

An aspect is a method for video decoding using an interpolation filter type associated with a decoded motion vector. The decoding may include decoding a first block of a current frame from an encoded video stream, decoding, by a processor in response to instructions stored on a non-transitory computer readable medium, a second block of the current frame from the encoded video stream, and outputting or storing the first block and the second block. Decoding the first block may include decoding a first motion vector from the encoded video stream, decoding an identifier of a first interpolation filter from the encoded video stream, and reconstructing the first block using the first motion vector and the first interpolation filter. Decoding the second block may include identifying the first motion vector from the first block as a selected motion vector for predicting the second block in response to decoding an inter-prediction mode identifier for decoding the second block, identifying the first interpolation filter as a selected interpolation filter for predicting the second block in response to identifying the first motion vector from the first block as the selected motion vector for predicting the second block, and reconstructing the second block using the first motion vector and the first interpolation filter.

Another aspect is a method for video decoding using an interpolation filter type associated with a decoded motion vector. The decoding may include decoding, by a processor in response to instructions stored on a non-transitory computer readable medium, a current block of a current frame from an encoded video stream, and outputting or storing the current block. Decoding the current block may include identifying previously decoded blocks spatially proximal to the current block in the current frame, identifying a motion vector from a selected previously decoded block from the previously decoded blocks spatially proximal to the current block as a selected motion vector for predicting the current block, identifying an interpolation filter in response to identifying the motion vector as a selected interpolation filter for predicting the current block, and reconstructing the current block using the selected motion vector and the selected interpolation filter.

Another aspect is a method for video encoding using an interpolation filter type associated with a motion vector. The encoding may include generating a first encoded block by encoding a first block from a current frame from an input video stream, outputting the first encoded block, generating, by a processor in response to instructions stored on a non-transitory computer readable medium, a second encoded block by encoding a second block from the current frame, and transmitting or storing the output bitstream. Encoding the first block may include identifying a first motion vector for predicting the first block, and identifying a first interpolation filter for predicting the first block. Outputting the first encoded block may include including the first motion vector in an output bitstream, and including an identifier of the first interpolation filter in the output bitstream. Encoding the second block may include identifying candidate motion vectors for predicting the second block. The candidate motion vectors may include the first motion vector, and a second motion vector for predicting the second block, wherein the second motion vector differs from the first motion vector, and wherein the second motion vector is a non-zero motion vector. Encoding the second block may include identifying, from the candidate motion vectors, a selected motion vector for predicting the second block, and on a condition that the selected motion vector is the first motion vector, identifying the first interpolation filter as a selected interpolation filter for predicting the second block, and omitting the selected motion vector for predicting the second block and an identifier of the selected interpolation filter for predicting the second block from the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views.

DETAILED DESCRIPTION

Figure 1:
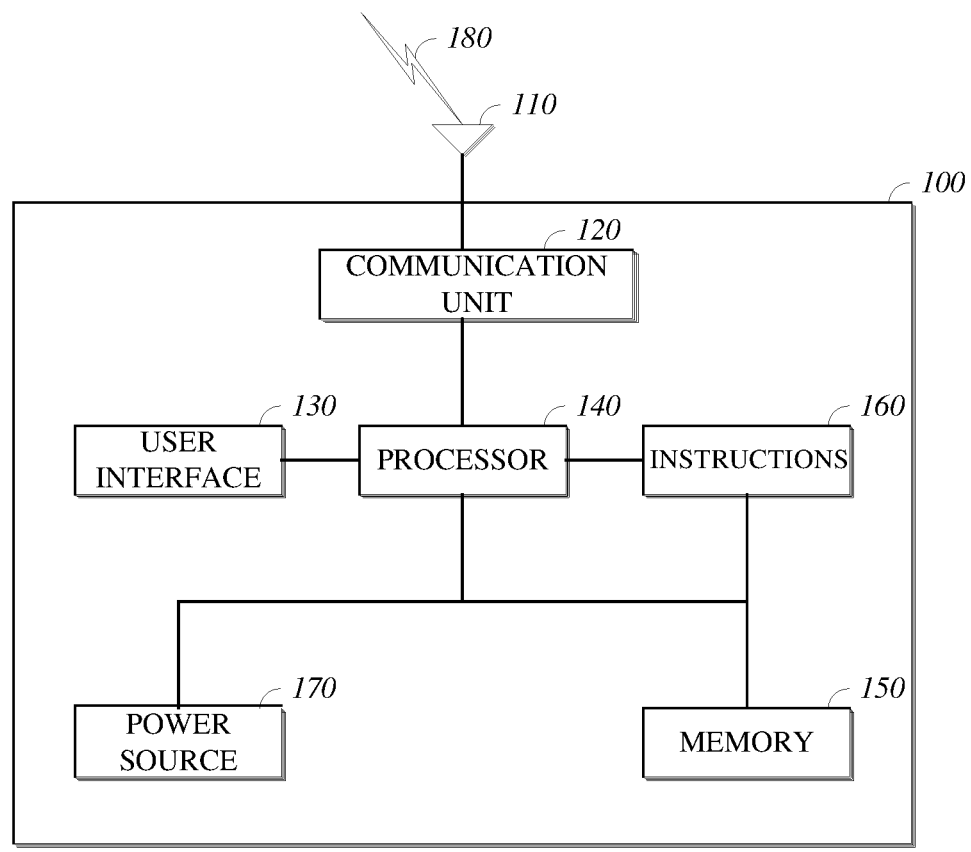
FIG. 1 is a diagram of a computing device in accordance with implementations of this disclosure.

Video compression schemes may include breaking each image, or frame, into smaller portions, such as blocks, and generating an output bitstream using techniques to limit the information included for each block in the output. An encoded bitstream can be decoded to re-create the source images from the limited information. In some implementations, the information included for each block in the output may be limited by reducing spatial redundancy, reducing temporal redundancy, or a combination thereof. For example, temporal or spatial redundancies may be reduced by predicting a frame based on information available to both the encoder and decoder, and including information representing a difference, or residual, between the predicted frame and the original frame.

In some implementations, motion prediction may include using an inter-prediction mode in which portions of a reference frame are compared with a block in a current frame. A motion vector may be defined to represent a block or pixel offset between the reference frame and the corresponding block or pixels of the current frame. However, indicating the motion vector in the output bitstream may increase the size of the output bitstream, which may reduce encoding efficiency. In some implementations, encoding efficiency may be improved by encoding blocks using motion vectors previously used for encoding neighboring, or spatially proximal, blocks. For example, the encoder may evaluate neighboring previously encoded blocks to identify candidate motion vectors for encoding the current block, may select one of the candidate motion vectors from the neighboring previously encoded blocks as the motion vector for coding the current block, may indicate an inter-prediction mode corresponding to the selected motion vector in the output bitstream, and may omit indicating the motion vector for predicting the current block in the output bitsream.

In some implementations, an interpolation filter may be used to adjust for sub-block or sub-pixel motion between the reference frame and the current frame. Subpixel motion may also be referred to as subpel motion or fractional pixel motion. In some embodiments, the encoder may identify a motion vector and a subpixel interpolation filter for encoding a block and may indicate the motion vector and an identifier of the subpixel interpolation filter in the encoded video stream. For example, the encoder may evaluate neighboring previously encoded blocks to identify candidate motion vectors for encoding the current block, may select one of the candidate motion vectors from the neighboring previously encoded blocks as the motion vector for coding the current block, may indicate an inter-prediction mode corresponding to the selected motion vector in the output bitstream, may omit indicating the motion vector for predicting the current block in the output bitsream, and may indicate an identifier of the subpixel interpolation filter for predicting the current block in the output bitstream. However, indicating the identifier of the subpixel interpolation filter in the output bitstream may increase the size of the output bitstream, which may reduce encoding efficiency.

In some embodiments, encoding efficiency may be improved by encoding blocks using interpolation filters previously used for encoding neighboring, or spatially proximal, blocks. For example, the encoder may evaluate neighboring previously encoded blocks to identify candidate motion vectors for encoding the current block, may select one of the candidate motion vectors from the neighboring previously encoded blocks as the motion vector for coding the current block, may identify the interpolation filter used for encoding the neighboring previously encoded block corresponding to the selected motion vector, may indicate an inter-prediction mode corresponding to the selected motion vector and the identified interpolation filter in the output bitstream, and may omit indicating the motion vector and the identified interpolation filter for predicting the current block in the output bitstream.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the computing device 100 can be integrated into any number of separate physical units. For example, the UI 130 and the processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 includes any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the computing device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor is operatively coupled with the communication interface 110, the communication unit 120, the UI 130, the memory 150, the instructions 160, and the power source 170 in the example of FIG. 1.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication interface 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication interface 110. The communication interface 110, the communication unit 120, the UI 130, the processor 140, the instructions 160, and the memory 150 are operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
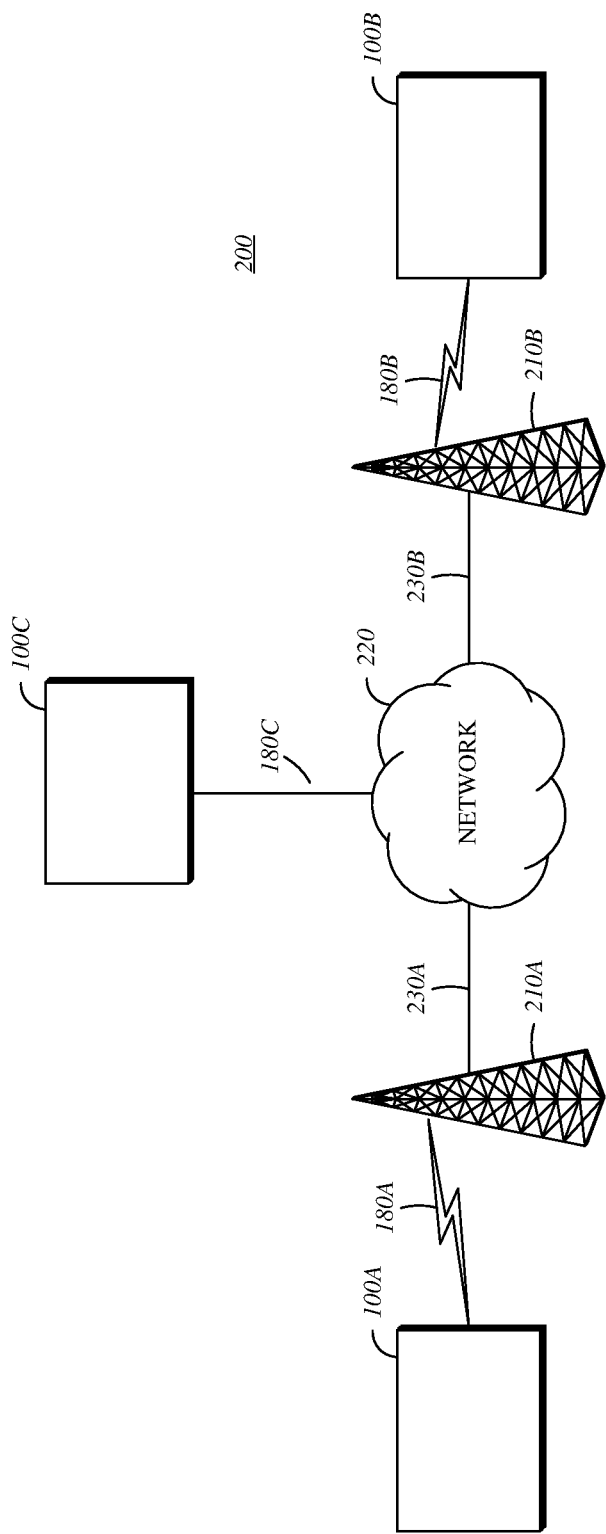
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. As shown, the computing and communication devices 100A/100B may be user devices, such as a mobile computing device, a laptop, a thin client, or a smartphone, and the computing and communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
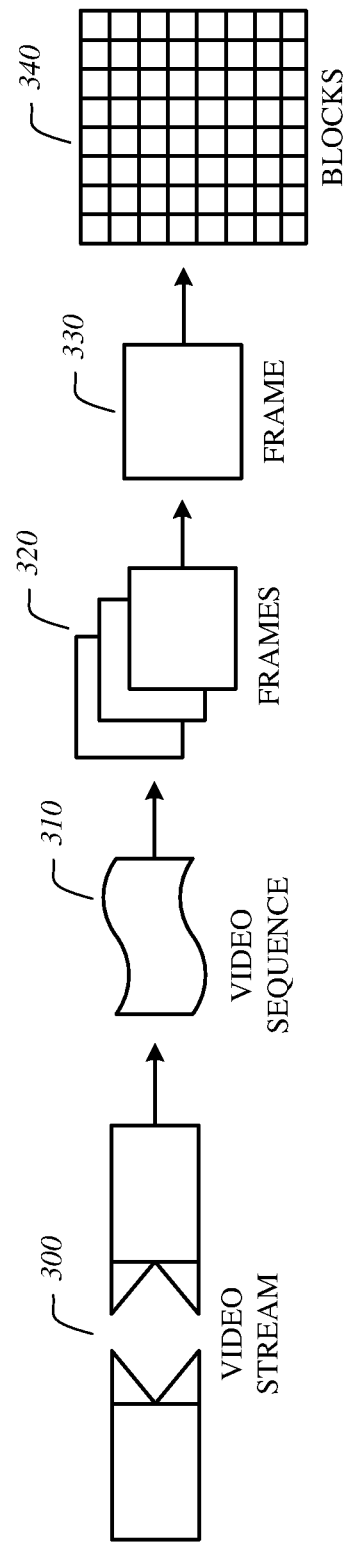
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
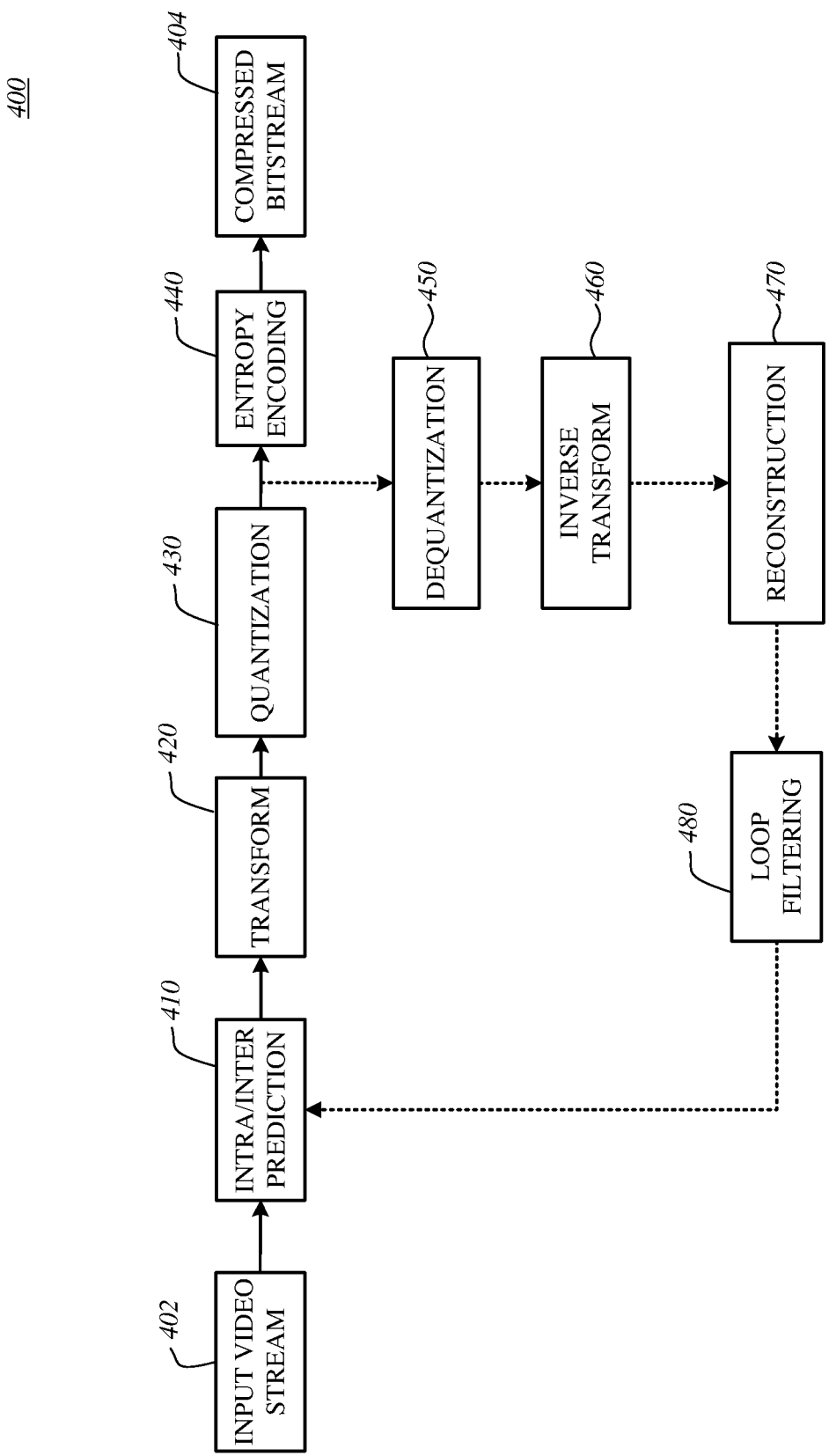
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter-prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter-prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter-prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT includes transforming a block into the frequency domain. The DCT includes using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
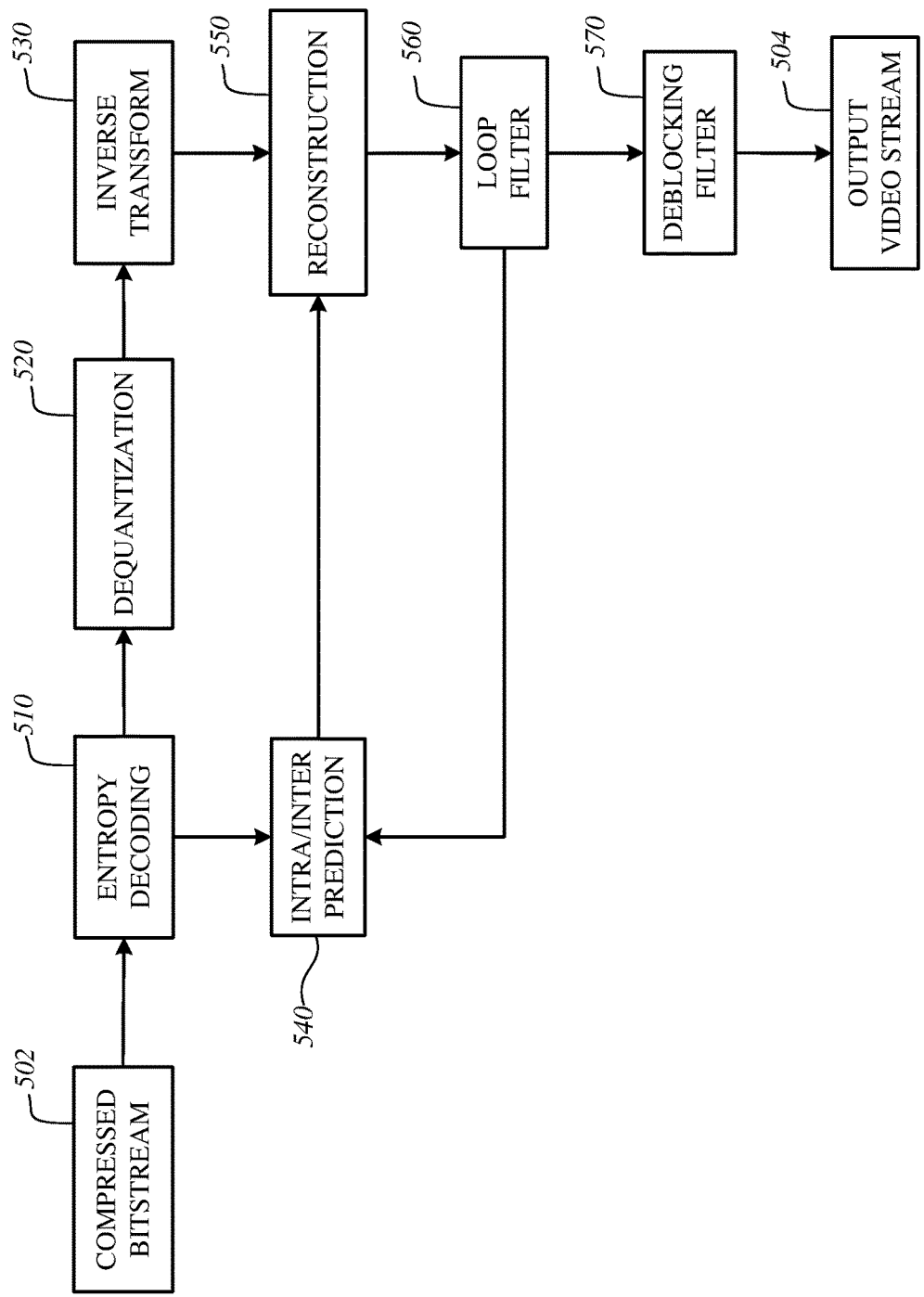
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter-prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter-prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transform unit 460 shown in FIG. 4. Using header information decoded from the compressed bitstream 502, the intra/inter-prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different portion, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block. In some implementations, more than one reference frame may be provided. For example, three reference frames may be selected from eight candidate reference frames.

In some implementations, the spatial difference between the location of the reference block in the reference frame and the current block in the current frame may be represented as a motion vector. The difference in pixel values between the reference block and the current block may be referred to as differential data, residual data, or as a residual block. Generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two dimensional data structure such as a matrix, or in a one dimensional data structure, such as a vector array.

For inter-prediction, the encoder 400 may convey encoded information for prediction blocks at block end points, including but not limited to a prediction mode, the prediction reference frame(s), motion vector(s) if needed, and subpixel interpolation filter type.

Figure 6:
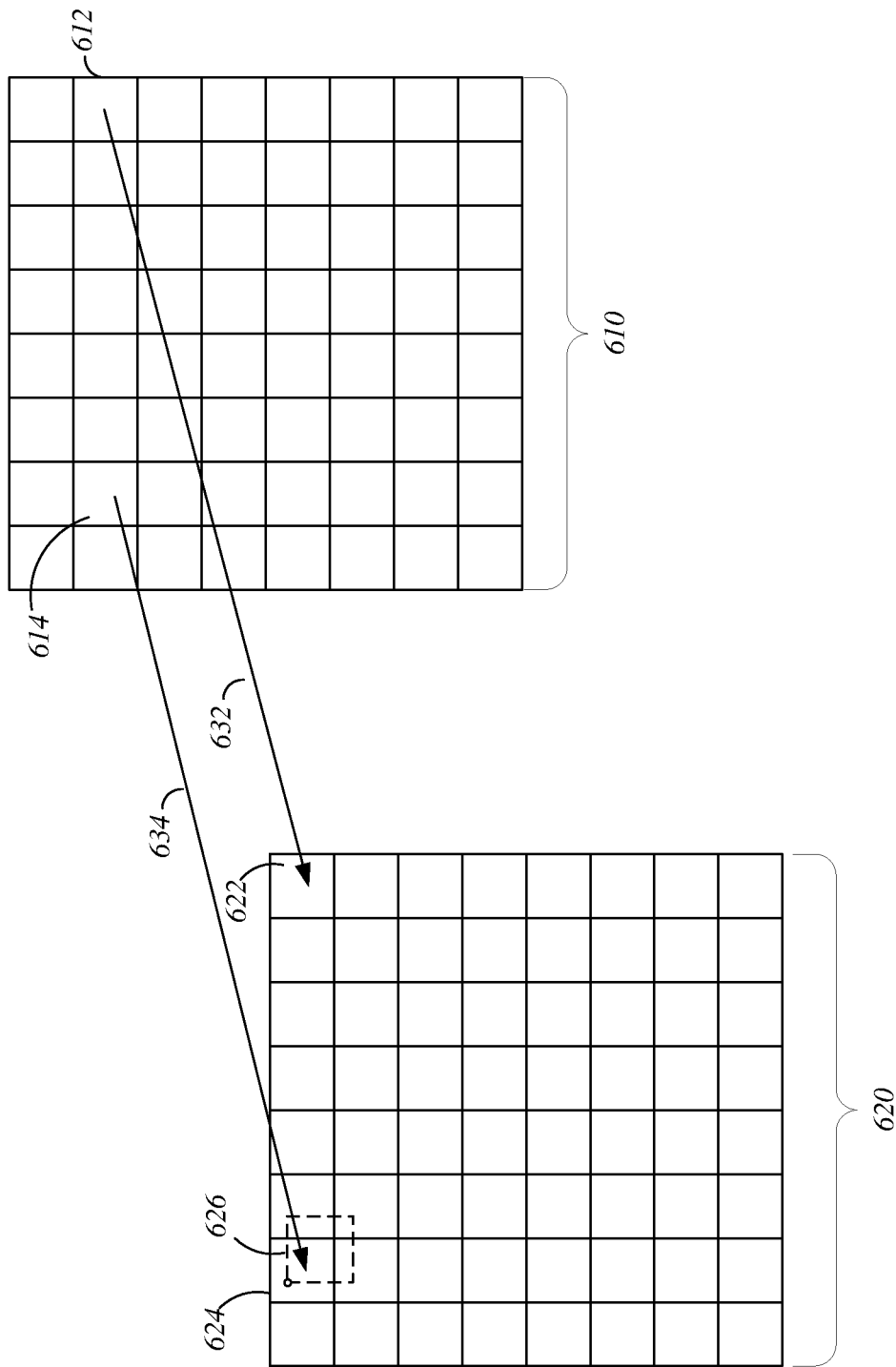
FIG. 6 is a block diagram of a motion vector having subpixel accuracy in accordance with implementations of this disclosure.

FIG. 6 is a block diagram of a representation of inter-prediction using a subpixel interpolation filter in accordance with implementations of this disclosure. Inter-prediction using a subpixel interpolation filter may be implemented in a decoder, such as the decoder 500 shown in FIG. 5, an encoder, such as the encoder 400 shown in FIG. 4, or both.

In some implementations, inter-prediction may include encoding a current frame 610, or a portion thereof, such as block 612 or block 614, with reference to a reference frame 620. For example, a motion vector 632/634 may indicate a spatial location of a reference block 622/624 in the reference frame 620 relative to the location of the corresponding block 612/614 in the current frame 610, the reference block 622/624 may be the portion of the reference frame 620 identified as most accurately matching the corresponding block 612/614 in the current frame 610, and the reference block 622/624 may be used to generate a prediction block for encoding the current frame 610.

In some implementations, the portion 626 of the reference frame 620 that most accurately matches a current block 614 of the current frame 610 may be offset from block or pixel boundaries, and inter-prediction may include using a sub-pixel interpolation filter. For example, inter-prediction may include using motion vector precision of ½ pel, ¼ pel, or ⅛ pel, and a subpixel interpolation filter may be used.

In some implementations, coding a current block may include identifying a prediction mode from multiple candidate prediction modes for coding the current block. For example, a video coder may evaluate the candidate prediction modes, which may include intra-prediction modes, inter-prediction modes, or both, to identify the optimal prediction mode. The optimal prediction mode may be, for example, the prediction mode that minimizes an error metric, such as a rate-distortion cost, for the current block.

In some implementations, the inter-prediction modes may include a new motion vector mode (NewMV), a zero motion vector mode (ZeroMV), a nearest motion vector mode (NearestMV), and a near motion vector mode (NearMV). The new motion vector mode (NewMV) may indicate that a new motion vector for the current block may be signaled expressly or explicitly in the encoded video stream. In some implementations, the new motion vector may be signaled differentially. For example, the new motion vector may be signaled using a difference between the new motion vector and a reference motion vector, such as a motion vector used for encoding a previously coded neighboring block. The zero motion vector mode (ZeroMV) may indicate that a zero motion vector, (0,0), which may indicate no motion, may be used for predicting the current block, and an express or explicit motion vector for predicting the current block may be omitted from the encoded video stream. In some implementations, the nearest motion vector mode (NearestMV) may indicate that a motion vector used for encoding a neighboring previously encoded block identified as the nearest motion vector may be used for predicting the current block, and an express or explicit motion vector for predicting the current block may be omitted from the encoded video stream. In some implementations, the near motion vector mode (NearMV) may indicate that a motion vector used for encoding a neighboring previously encoded block identified as the near motion vector may be used for predicting the current block, and an express or explicit motion vector for predicting the current block may be omitted from the encoded video stream.

In some implementations, the encoder may identify candidate motion vectors for encoding the current block. For example, the candidate motion vectors may include the zero motion vector, a new motion vector, a near motion vector, and a nearest motion vector. In some embodiments, the encoder may evaluate neighboring, or proximal, previously encoded blocks to identify the near motion vector and the nearest motion vector. For example, the near motion vector may be identified from a first neighboring, or proximal, previously encoded block, and the nearest motion vector may be identified from a second neighboring, or proximal, previously encoded block.

In some implementations, the decoder may identify candidate motion vectors for decoding a current block. For example, the candidate motion vectors may include a near motion vector, and a nearest motion vector. In some embodiments, the decoder may evaluate neighboring, or proximal, previously decoded blocks to identify the near motion vector and the nearest motion vector. For example, the near motion vector may be identified from a first neighboring, or proximal, previously decoded block, and the nearest motion vector may be identified from a second neighboring, or proximal, previously decoded block.

In some implementations, coding the current block may include identifying an interpolation filter for predicting the current block. For example, an interpolation filter may be selected from candidate interpolation filters. In some implementations, the candidate interpolation filters may be ¹⁄₁₆-pel precision filters, and may include a Bilinear filter, an 8-tap filter (EIGHTTAP), a sharp 8-tap filter (EIGHTTAP_SHARP), a smooth 8-tap filter (EIGHTTAP_SMOOTH), or a combination thereof.

Figure 7:
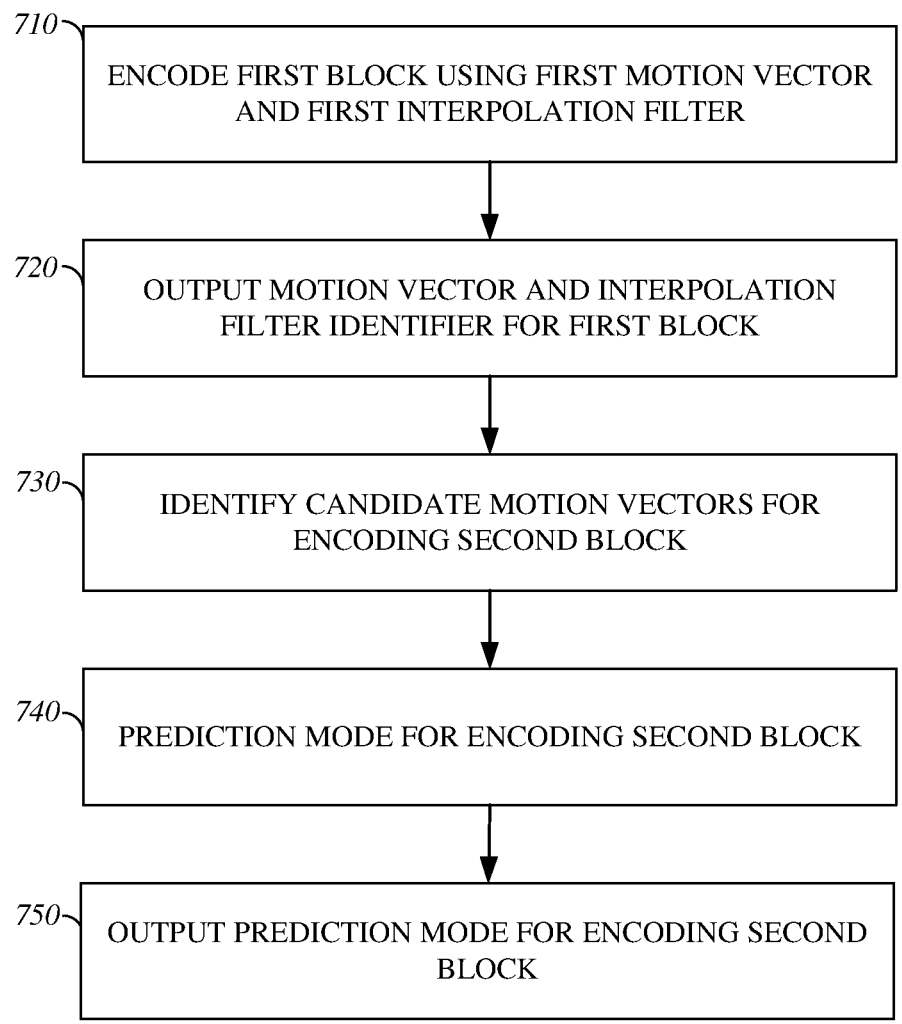
FIG. 7 is a flowchart diagram of a process for encoding using an interpolation filter associated with an encoded motion vector in accordance with implementations of this disclosure.

FIG. 7 is a flowchart diagram of an example method for encoding using an interpolation filter associated with a motion vector in accordance with implementations of this disclosure. In some implementations, encoding using an interpolation filter associated with a motion vector may be implemented in an encoder, such as the encoder 400 shown in FIG. 4.

In some implementations, encoding using an interpolation filter associated with a motion vector may include encoding a first block at 710, outputting a motion vector and interpolation filter identifier for the first block at 720, identifying candidate motion vectors for encoding a second block at 730, identifying a prediction mode for encoding the second block at 740, outputting a prediction mode for encoding the second block at 750, or a combination thereof.

In some implementations, a first block may be encoded at 710. For example, an encoder, such as the encoder 400 shown in FIG. 4, may encode a first block of a current frame, such as the block at the top left of the frame 610 shown in FIG. 6. In some implementations, encoding the first block may include identifying a motion vector for encoding the first block. Although not shown separately in FIG. 7, in some implementations, identifying the motion vector for encoding the first block may include identifying candidate motion vectors for encoding the first block. The candidate motion vectors may include a new motion vector, a zero motion vector, a near motion vector, a nearest motion vector, or a combination thereof. The near motion vector and the nearest motion vector may be identified by evaluating previously encoded blocks neighboring, or proximate to, the first block in the current frame. For example, the blocks of the current frame may be encoded in raster scan order, and the previously encoded blocks neighboring the first block in the first frame may include the block to the left of the first block, the block above the first block, the block above and to the left of the first block, the block above and to the right of the first block, or a combination thereof. In some implementations, the new motion vector may be identified for encoding the first block and an interpolation filter may be identified for encoding the first block. In some implementations, the interpolation filter may be a subpixel interpolation filter such as a Bilinear filter, an 8-tap filter (EIGHTTAP), a sharp 8-tap filter (EIGHTTAP_SHARP), or a smooth 8-tap filter (EIGHTTAP_SMOOTH).

In some implementations, a reference block may be identified in a reference frame based on the motion vector, and a prediction block may be generated from the reference block using the interpolation filter. In some implementations, a residual, or prediction error, between the input, or source, first block and the prediction block may be included in the output bitstream.

In some implementations, the motion vector and an identifier of the interpolation filter used for coding the first block may be included in the output bitstream at 720, such as in a header for the first block. In some implementations, the motion vector for coding the first block may be associated with the interpolation filter for coding the first block.

In some implementations, a second, or current, block of the current frame may be encoded subsequent to encoding the first block of the current frame. For example, an encoder, such as the encoder 400 shown in FIG. 4, may encode a second block, such as block 614 from frame 610 shown in FIG. 6.

In some implementations, encoding the current block may include identifying candidate motion vectors for encoding a current block at 730. The candidate motion vectors may include a new motion vector, a zero motion vector, a near motion vector, a nearest motion vector, or a combination thereof. The near motion vector and the nearest motion vector may be identified by evaluating previously encoded blocks neighboring, or proximate to, the current block in the current frame. For example, the blocks of the current frame may be encoded in raster scan order, and the previously encoded blocks neighboring the current block in the current frame may include the block to the left of the current block, the block above the current block, the block above and to the left of the current block, the block above and to the right of the current block, or a combination thereof; however different previously encoded blocks neighboring the current block, or a different encoding order may be used. In some embodiments, the first block encoded at 710 may be a previously encoded block neighboring the current block in the current frame, and the motion vector used for encoding the first block may be identified as the near motion vector or the nearest motion vector for coding the current block.

In some implementations, a prediction mode may be identified for encoding the second block at 740. For example, an inter-prediction mode, such as new motion vector mode (NewMV), zero motion vector mode (ZeroMV), nearest motion vector mode (NearestMV), or near motion vector mode (NearMV), may be identified for encoding the current block.

In some implementations, the nearest motion vector mode may be identified for encoding the current block, and a corresponding nearest motion vector may be identified as the motion vector for encoding the current block. For example, the first block may be a previously encoded block neighboring the current block in the current frame, the motion vector used for encoding the first block may be identified as the nearest motion vector, the prediction mode for encoding the current block may be identified as the nearest motion vector mode, and the motion vector used for encoding the first block may be identified as the motion vector for encoding the current block. Similarly, in some implementations, the near motion vector mode may be identified for encoding the current block, and a corresponding near motion vector may be identified as the motion vector for encoding the current block. For example, the first block may be a previously encoded block neighboring the current block in the current frame, the motion vector used for encoding the first block may be identified as the near motion vector, the prediction mode for encoding the current block may be identified as the near motion vector mode, and the motion vector used for encoding the first block may be identified as the motion vector for encoding the current block.

In some implementations, identifying the prediction mode at 740 may include identifying an interpolation filter for encoding the current block based on the motion vector identified for encoding the current block. In some implementations, the motion vector identified for encoding the current block may be a new motion vector, and identifying the interpolation filter for encoding the current block may include evaluating candidate interpolation filters to identify an optimal interpolation filter. In some implementations, the motion vector identified for encoding the current block may be the nearest motion vector and the interpolation filter used for encoding the block corresponding to the nearest motion vector may be identified as the interpolation filter for encoding the current block. For example, the motion vector used for encoding the first block may be identified as the nearest motion vector, the prediction mode may be identified as nearest motion vector mode, and the interpolation filter used for encoding the first block may be identified as the interpolation filter for encoding the second block. In some implementations, the motion vector identified for encoding the current block may be the near motion vector and the interpolation filter used for encoding the block corresponding to the near motion vector may be identified as the interpolation filter for encoding the current block. For example, the motion vector used for encoding the first block may be identified as the near motion vector, the prediction mode may be identified as the near motion vector mode, and the interpolation filter used for encoding the first block may be identified as the interpolation filter for encoding the second block.

In some implementations, for encoding the current frame, a reference block may be identified in a reference frame based on the identified motion vector, and a prediction block may be generated from the reference block using the identified interpolation filter. In some implementations, a residual, or prediction error, between the input, or source, current block and the prediction block may be included in the output bitstream.

In some implementations, the prediction mode used for coding the current block may be included in the output bitstream at 750, such as in a header for the current block. In some implementations, the motion vector and an identifier of the interpolation filter used for coding the current block may be omitted from the output bitstream. For example, the prediction mode may be identified as the nearest motion vector mode, the near motion vector mode, or the zero motion vector mode, the prediction mode may be included in the output bitstream, and the motion vector and an identifier of the interpolation filter may be omitted from the output bitstream.

Figure 8:
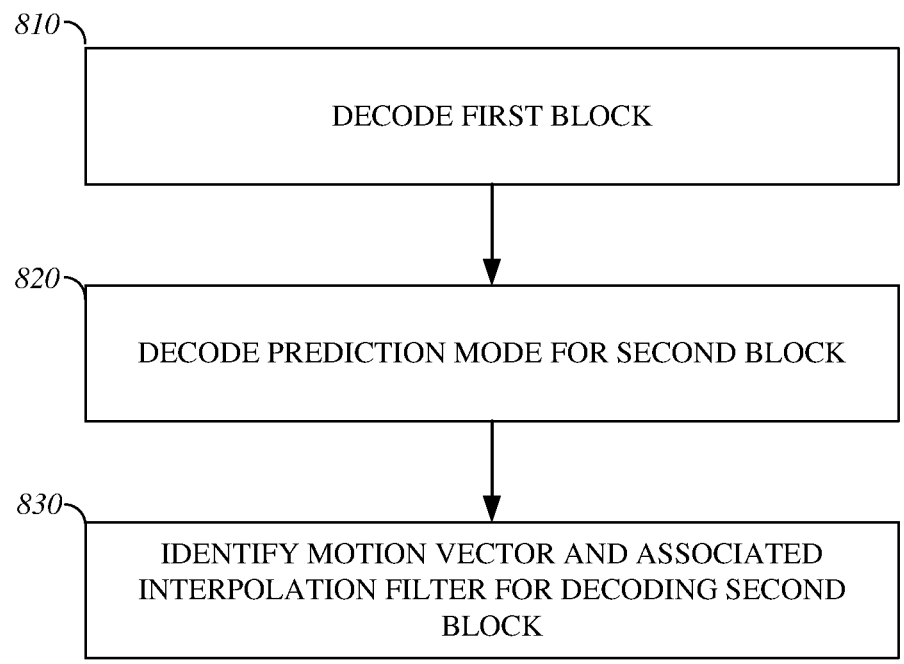
FIG. 8 is a flowchart diagram of a process for decoding using an interpolation filter associated with a decoded motion vector in accordance with implementations of this disclosure.

FIG. 8 is a flowchart diagram of an example of a method for decoding using an interpolation filter associated with a motion vector in accordance with implementations of this disclosure. In some implementations, decoding using an interpolation filter associated with a motion vector may be implemented in a decoder, such as the decoder 500 shown in FIG. 5.

In some implementations, decoding using an interpolation filter associated with a motion vector may include decoding first block at 810, decoding a prediction mode for decoding a second, or current, block at 820, identifying a motion vector and an associated interpolation filter for decoding the current block at 830, or a combination thereof.

In some implementations, first block of a current frame may be decoded at 810. In some implementations, decoding the first block may include decoding a prediction mode, such as new motion vector mode, for decoding the first block. In some implementations, the prediction mode may be the new motion vector mode and decoding the first block may include decoding a motion vector and an identifier of an interpolation filter, such as a subpixel interpolation filter for decoding the first block. In some implementations, decoding the first block may include decoding a residual, or prediction error for the first block. In some implementations, decoding the first block may include identifying a reference block in a reference frame based on the decoded motion vector, generating a predicted block from the reference block using the interpolation filter indicated by the decoded interpolation filter identifier, and generating a reconstructed block by adding the decoded residual to the predicted block. In some implementations, the prediction mode, the motion vector, the identifier of the interpolation filter, or a combination thereof, may be decoded from a header for the first block in the encoded video stream. In some implementations, the reconstructed block may be included in an output, such as an output for presentation.

In some implementations, a prediction mode for decoding a second, or current, block may be identified at 820. In some implementations, identifying the prediction mode for decoding the second block may include decoding the prediction mode from the encoded bitstream. For example, the prediction mode may be decoded from a header for the current block in the encoded video steam. In some implementations, the header for the current block may omit a motion vector, an identifier of an interpolation filter, or both, for decoding the current block. In some implementations, the decoded prediction mode may indicate the nearest motion vector mode, the near motion vector mode, or the zero motion vector mode, and the encoded video stream may omit a motion vector and an identifier of an interpolation filter for decoding the current block.

In some implementations, a motion vector and an associated interpolation filter for decoding the current block may be identified at 830. For example, the prediction mode for decoding the current block identified at 820 may be the nearest motion vector mode or the near motion vector mode, and a motion vector and an associated interpolation filter for decoding the current block may be identified.

In some implementations, identifying the motion vector for decoding the current block may include identifying candidate motion vectors for decoding the current block. Identifying the candidate motion vectors may include identifying a near motion vector, a nearest motion vector, or both. The near motion vector and the nearest motion vector may be identified by evaluating previously decoded blocks neighboring, or proximate to, the current block in the current frame. For example, the blocks of the current frame may be decoded in raster scan order, and the previously decoded blocks neighboring the current block in the current frame may include the block to the left of the current block, the block above the current block, the block above and to the left of the current block, the block above and to the right of the current block, or a combination thereof; however different previously decoded blocks neighboring the current block, or a different decoding order may be used. In some embodiments, the first block decoded at 810 may be a previously decoded block neighboring the current block in the current frame, and the motion vector used for decoding the first block may be identified as the near motion vector or the nearest motion vector for decoding the current block.

In some embodiments, the prediction mode decoded for the second block at 820 may be the nearest motion vector mode, the first block decoded at 810 may be a previously decoded block neighboring the current block in the current frame, and the motion vector used for decoding the first block may be identified as the nearest motion vector for decoding the current block, and, based on the decoded prediction mode for the current block, the motion vector used for decoding the first block may be identified as the selected motion vector for decoding the current block. Similarly, the prediction mode decoded for the second block at 820 may be the near motion vector mode, the first block decoded at 810 may be a previously decoded block neighboring the current block in the current frame, and the motion vector used for decoding the first block may be identified as the near motion vector for decoding the current block, and, based on the decoded prediction mode for the current block, the motion vector used for decoding the first block may be identified as the selected motion vector for decoding the current block.

In some implementations, an interpolation filter associated with the selected motion vector may be identified as the interpolation filter for encoding the current block.

For example, the prediction mode decoded for the second block at 820 may be the nearest motion vector mode, the first block decoded at 810 may be a previously decoded block neighboring the current block in the current frame, and the motion vector used for decoding the first block may be identified as the nearest motion vector for decoding the current block, based on the decoded prediction mode for the current block, the motion vector used for decoding the first block may be identified as the selected motion vector for decoding the current block, and, based on the selected motion vector the interpolation filter used for decoding the first block, which may be associated with the selected motion vector, may be identified as the selected interpolation filter for decoding the current block. Similarly, the prediction mode decoded for the second block at 820 may be the near motion vector mode, the first block decoded at 810 may be a previously decoded block neighboring the current block in the current frame, the motion vector used for decoding the first block may be identified as the near motion vector for decoding the current block, based on the decoded prediction mode for the current block, the motion vector used for decoding the first block may be identified as the selected motion vector for decoding the current block, and, based on the selected motion vector the interpolation filter used for decoding the first block, which may be associated with the selected motion vector, may be identified as the selected interpolation filter for decoding the current block.

In some implementations, decoding the current block may include identifying a reference block in a reference frame based on the selected motion vector, generating a predicted block from the reference block using the selected interpolation filter, and generating a reconstructed block by adding the decoded residual to the predicted block. In some implementations, the reconstructed block may be included in an output, such as an output for presentation.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a computer program that, when executed, carries out any of the respective methods, algorithms and/or instructions described herein. In addition or alternatively, for example, a special purpose computer/processor can be utilized that contains specialized hardware for carrying out any of the methods, algorithms, or instructions described herein.

The transmitting station 100A and the receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable implementation schemes for the transmitting station 100A and the receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
   decoding a first block of a current frame from an encoded video stream, wherein decoding the first block includes:
      decoding a first motion vector from the encoded video stream;
      decoding, from the encoded video stream, an identifier of a first interpolation filter for subpixel interpolation; and
      reconstructing the first block using the first motion vector and the first interpolation filter;
   decoding, by a processor, using a selected motion vector and a selected interpolation filter, a second block of the current frame from the encoded video stream, wherein decoding the second block includes:
      decoding an inter-prediction mode;
      in response to the inter-prediction mode indicating that the first motion vector of the first block is to be used for reconstructing the second block:
         identifying the first motion vector from the first block as the selected motion vector for predicting the second block;
         omitting decoding, from the encoded video stream, the selected interpolation filter; and
         identifying the first interpolation filter that is associated with the first motion vector as the selected interpolation filter for predicting the second block;
      in response to the inter-prediction mode indicating a new motion vector mode:
         decoding, from the encoded video stream, the selected motion vector;
         decoding, from the encoded video stream, the identifier of the selected interpolation filter; and
      reconstructing the second block using the selected motion vector and the selected interpolation filter;
   decoding a third block of the current frame from the encoded video stream, wherein decoding the third block includes:
      identifying previously decoded blocks spatially proximal to the third block in the current frame, wherein the previously decoded blocks include the second block and omit the first block;
      identifying the second block from the previously decoded blocks in response to decoding the inter-prediction mode for decoding the third block;
      identifying the first motion vector from the first block as a selected motion vector for predicting the third block in response to identifying the second block from the previously decoded blocks;
      identifying the first interpolation filter as a selected interpolation filter for predicting the third block in response to identifying the first motion vector from the first block as the selected motion vector for predicting the third block; and reconstructing the third block using the first motion vector and the first interpolation filter; and outputting or storing the first block, the second block, and the third block.

2. The method of claim 1, wherein the first motion vector is a non-zero motion vector.

3. The method of claim 1, wherein decoding the first block includes:

identifying information associating the first interpolation filter with the first motion vector.

4. The method of claim 3, wherein identifying the first interpolation filter as the selected interpolation filter for predicting the second block includes identifying the first interpolation filter based on the information associating the first interpolation filter with the first motion vector.

5. The method of claim 1, wherein decoding the second block is subsequent to decoding the first block.

6. The method of claim 5, wherein the first block is spatially proximal to the second block in the current frame.

7. A method comprising:

decoding, by a processor in response to instructions stored on a non-transitory computer readable medium, using a selected motion vector and a selected interpolation filter, a current block of a current frame from an encoded video stream, wherein decoding the current block includes:

decoding, from the encoded video stream, an inter-prediction mode;

in response to the inter-prediction mode indicating that the selected motion vector is a motion vector of one of previously decoded blocks:

identifying the motion vector from a selected previously decoded block of the previously decoded blocks as the selected motion vector for predicting the current block;

omitting decoding, from the encoded video stream, the selected interpolation filter; and identifying an interpolation filter that is associated with the motion vector from the selected previously decoded block as the selected interpolation filter for predicting the current block; and reconstructing the current block using the selected motion vector and the selected interpolation filter;

decoding a second block of the current frame from the encoded video stream, wherein decoding the second block includes:

identifying previously decoded blocks spatially proximal to the second block in the current frame, wherein the previously decoded blocks spatially proximal to the second block include the current block and omit the selected previously decoded block from the previously decoded blocks spatially proximal to the current block;

identifying the current block from the previously decoded blocks spatially proximal to the second block in response to decoding the inter-prediction mode for decoding the second block as the selected previously decoded block for predicting the second block;

identifying, as a selected motion vector for predicting the second block, the motion vector from the selected previously decoded block from the previously decoded blocks spatially proximal to the current block in response to identifying the current block from the previously decoded blocks as the selected previously decoded block for predicting the second block;

identifying the interpolation filter, as a selected interpolation filter for predicting the second block, in response to identifying the motion vector as the selected motion vector for predicting the second block; and reconstructing the second block using the selected motion vector for predicting the second block and the selected interpolation filter for predicting the second block; and outputting or storing the current block and the second block.

8. The method of claim 7, wherein decoding the current block includes decoding a header for the current block from the encoded video stream, wherein the header includes the inter-prediction mode for decoding the current block, and wherein the header omits an identifier of a selected interpolation filter for predicting the current block and omits a selected motion vector for predicting the current block.

9. The method of claim 7, wherein the motion vector is a non-zero motion vector.

10. A method, comprising:

generating a first encoded block by encoding a first block from a current frame from an input video stream, wherein encoding the first block includes:

identifying a first motion vector for predicting the first block, wherein the first motion vector has sub-pixel precision; and identifying a first interpolation filter for predicting the first block;

outputting the first encoded block by:

including, in an output bitstream, a first inter-prediction mode indicative of the first motion vector; and including, in the output bitstream, a first identifier of the first interpolation filter;

generating, by a processor, a second encoded block by encoding a second block from the current frame, wherein encoding the second block includes:

identifying candidate motion vectors for predicting the second block, wherein the candidate motion vectors include the first motion vector;

identifying, from the candidate motion vectors, a selected motion vector for predicting the second block;

in response to determining that the selected motion vector for predicting the second block is the first motion vector used for predicting the first block:

identifying the first interpolation filter as a selected interpolation filter for predicting the second block;

predicting the second block using the first motion vector and the first interpolation filter; and omitting encoding, in the output bitstream, the selected motion vector for predicting the second block and an identifier of the selected interpolation filter for predicting the second block;

generating a third encoded block by encoding a third block from the current frame, wherein encoding the third block includes:

identifying previously coded blocks proximal to the third block in the current frame, wherein the previously coded blocks proximal to the third block include the second block and omit the first block;

identifying candidate motion vectors for predicting the third block based on the previously coded blocks, wherein the candidate motion vectors include the first motion vector;
identifying, from the candidate motion vectors for predicting the third block, a selected motion vector for predicting the third block;
on a condition that the selected motion vector for predicting the third block is the first motion vector:
    identifying the first interpolation filter as a selected interpolation filter for predicting the third block; and
    omitting the selected motion vector for predicting the third block and an identifier of the selected interpolation filter for predicting the third block from the output bitstream; and
transmitting or storing the output bitstream.

11. The method of claim 10, wherein the first motion vector is a non-zero motion vector.

12. The method of claim 10, wherein including the first identifier of the first interpolation filter in the output bitstream includes including the first identifier of the first interpolation filter in the output bitstream such that the first motion vector is associated with the first interpolation filter.

13. The method of claim 10, wherein encoding the second block is subsequent to encoding the first block.

14. The method of claim 10, further comprising:
on a condition that the selected motion vector being a new motion vector:
    evaluating candidate interpolation filters to identify a second interpolation filter for encoding the second block; and
    encoding a second identifier indicative of the second interpolation filter associated with the selected motion vector.

* * * * *